Figure 1:
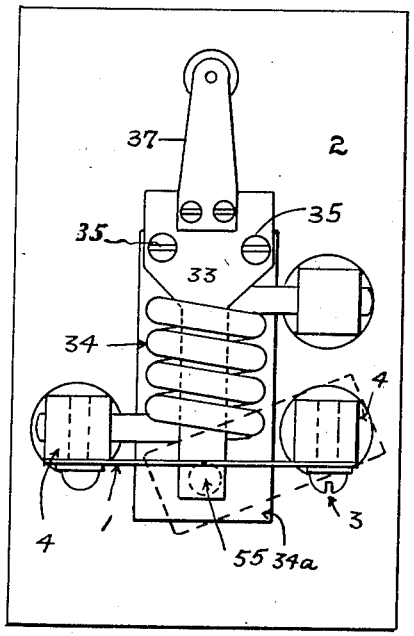

Nov. 10, 1925.

H. E. WHITE

ELECTRIC CIRCUIT PROTECTOR

Filed June 14, 1921   3 Sheets-Sheet 1

1,561,386

HAROLD ELIJAH WHITE   INVENTOR

BY *P. F. Bourne*

ATTORNEY

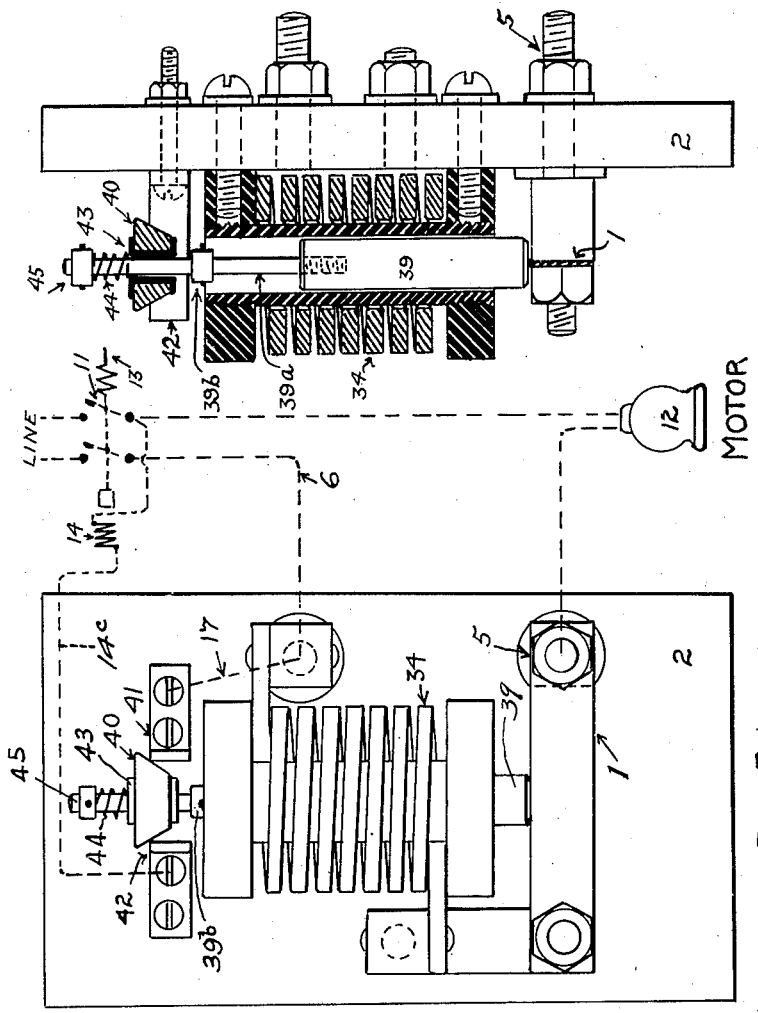

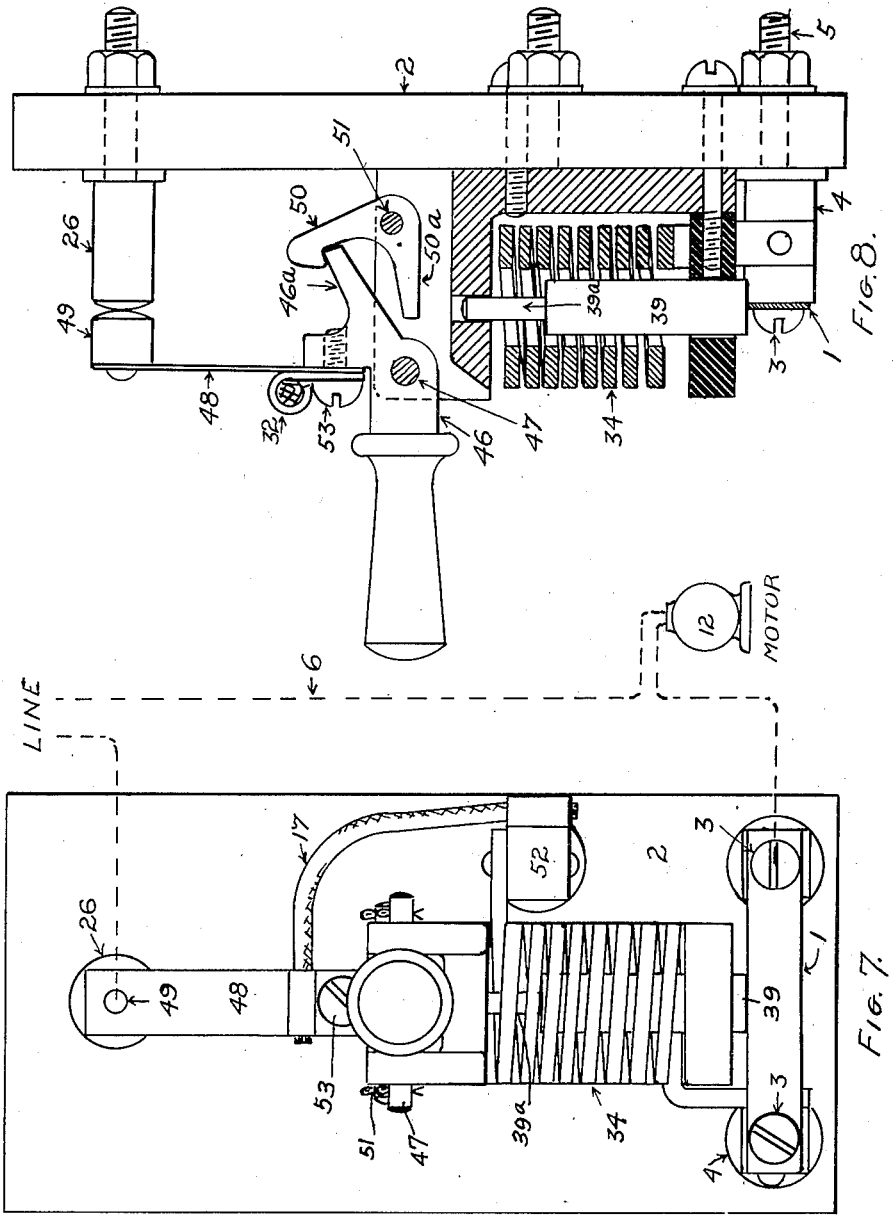

Patented Nov. 10, 1925.

1,561,386

UNITED STATES PATENT OFFICE.

HAROLD E. WHITE, OF MONTCLAIR, NEW JERSEY.

ELECTRIC-CIRCUIT PROTECTOR.

Application filed June 14, 1921. Serial No. 477,424.

*To all whom it may concern:*

Be it known that I, HAROLD E. WHITE, a citizen of the United States, and resident of Montclair, in the county of Essex and State of New Jersey, have invented certain new and useful Improvements in Electric-Circuit Protectors, of which the following is a specification.

My invention has reference to means for protecting electric circuits against injury by overload, my invention having reference particularly to breaking or disconnecting an electric circuit whenever it has carried an electric current of such duration and magnitude that further continuation of the current will be liable to injure the electric conductors or the apparatus in the circuit thereof. Other devices for a like purpose have been used, such as fuses, or circuit-breakers adapted to be opened by overload relays in connection with time delay mechanism, such as a dash-pot.

In carrying out my invention I provide a magnet adapted to operate means for controlling a circuit to be protected against injury by overload and I provide a member cooperative with the magnet or its core or armature, which member is magnetically reversible so as to cooperate with the magnet or its core or armature under a certain condition and to release the magnet or its core or armature under a different condition in said circuit. In the embodiment of my invention herein set forth I utilize, as the said magnetically reversible member, which is to say a metallic element which, when normally cold, will cooperate with the magnet or its core or armature to retain the same in set position to control the first named circuit, said material being of such a character that when heated substantially to a predetermined temperature at which said circuit will be liable to injury, said member will become nonmagnetic with respect to the magnet, to release the latter or its core or armature for changing the condition of said first named circuit.

As a particular form of metal for the member in the circuit to cooperate with the magnet I prefer a nickel-iron alloy, having the characteristic that when normally cool it will magnetically cooperate with the magnet or its armature to retain it and when heated the alloy will cease to be magnetic at an appropriate temperature. A suitable material for my purpose comprises an alloy containing about one part of nickel to two parts of iron by weight. An alloy containing approximately 35% nickel and 65% of iron, with traces of other materials, is very suitable for my present purpose. Such an alloy ceases to be magnetic when heated to about 150° C., and becomes magnetic again when cooled to a slightly lower temperature, according to the character of the alloy. Other nickel-iron alloys having low transformation points are well known and may be used for my purpose. The temperature referred to is so low as to be convenient and safe for the material, but high enough so that the latter can not be heated so as to become non-magnetic by means other than the intended one. The nearest approach by pure metals to the above named temperature, so far as I am aware, is 310° C., for nickel and a full red heat for iron or cobalt, but these last named materials, if used separately, will be likely to undergo rapid deterioration, and injury to other adjacent materials might also result from the high temperature attained if such metals alone were used to cooperate with the magnet in accordance with my invention. By using the member, in the circuit I have referred to, made of the alloy referred to above, employed in the field of attraction of a magnet or its armature and utilizing the force of attraction existing between such alloy and the magnet, or its core or armature I am enabled to maintain an electric switch, controlled by said magnet, in its operative position, whereby if such member should be heated by the electric current in the circuit in such a way that any current in excess of a safe amount would, after a time, produce the non-magnetic state in the alloy the latter would release the magnet or its armature to cause the switch to operate to switch off or change the flow of current in the circuit controlled by the switch.

My invention also comprises novel details of improvement that will be more fully hereinafter set forth and then pointed out in the claims.

Figure 2:
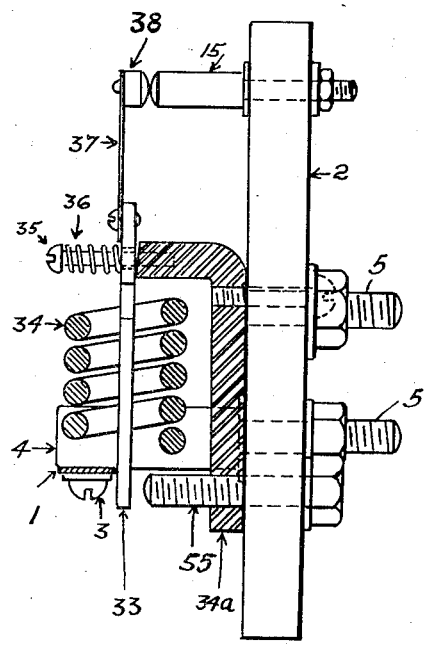
Figure 3:
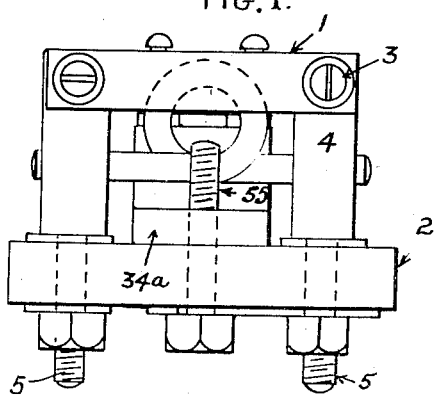
Figure 4:
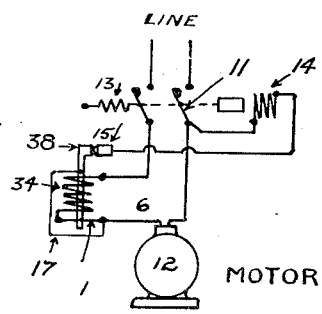

Reference is to be had to the accompanying drawings forming part hereof, wherein Figure 1 is a face view of my improvement illustrating an electromagnet; Fig. 2 is a partly sectional side view of Fig. 1; Fig. 3 is an end view of Fig. 1; Fig. 4 is a diagrammatic view illustrating the use of the circuit protector of Figs. 1, 2 and 3; Fig. 5 is a face view and Fig. 6 a partly sectional side view thereof, illustrating an electromagnet of the solenoid type utilized in my invention; Fig. 7 is a face view and Fig. 8 is a partly sectioned side view of the class of circuit protector shown in Figs. 5 and 6, illustrating a modified form of circuit protector or switch.

Similar numerals of reference indicate corresponding parts in the several views.

The numeral 1 indicates a magnetically reversible member, such as the metal alloy I have referred to, to be heated by the current in a circuit to be protected. Said member may be carried upon a suitable support 2, such as a block or base of insulating material. I have shown member 1 secured by screws 3 to clips 4, secured upon base 2 by screws or bolts 5 to which the line conductors 6 of the circuit to be protected may be attached.

In Figures 1 to 4 a simple form of construction is shown wherein an electromagnet is utilized, having a movable member or tongue 33, in the nature of an armature, to cooperate with member 1 and with screw 55, the magnetizable member 34ª of which magnet is in contact with screw 55 to magnetize the latter, holding magnet 14 being utilized for a switch 11. Member 33 is shown movable within the coil 34 of the magnet between member 1 and screw 55, and is shown movably supported upon screws 35 attached to member 34ª, springs 36 on said screws pressing against member 33 tending normally to tilt member 33 into engagement with member 1. Member 33 carries a spring 37 having a contact 38 to engage contact 15 in the circuit of holding magnet 14 of switch 11, the circuit of which magnet is shunted at 17 around coil 34. The coil 34 is included with member 1 in the main line circuit of the motor 12, and when switch 11 is closed the current flowing through coil 34 causes magnetization of the iron member or tongue 33 as well as iron screw 55, there thus being a tendency to attract member 33 by screw 55, tending to separate member 33 from the magnetically reversible member 1. When member 1 is in the normally cold or magnetic condition the attraction between it and member or tongue 33 will be greater than the attraction between screw 55 and member or tongue 33, so that the circuit of magnet 14 will remain closed at 15, 38, while current is flowing in the main line 6 with switch 11 closed and retained by magnet 14. The circuit of magnet 14 is shown branched at 17 around coil 34. When member 1 becomes heated to lose its magnetic attractiveness the attraction of tongue 33 towards screw 55 will prevail, and said member or tongue will move toward screw 55 and the circuit of holding magnet 14 will be broken at 15, 38, permitting switch 11 to open. When the current is thus shut off from the main line the member or tongue 33 will no longer be magnetic and spring 36 will restore member or tongue 33 into contact with magnetically reversible member 1 to close contact at 15, 38, so that when switch 11 is again closed the circuit of the holding magnet 14 will be in condition to cause said magnet to retain switch 11 when it is manually closed.

Figs. 5 and 6 illustrate a modification of the electromagnet idea of Figs. 1 to 4, wherein the magnet coil 34 is provided with a freely moving core or member 39 adapted to cooperate by gravity toward member 1 to engage the latter. Core 39 carries a contact 40 adapted to engage contacts 41, 42, in the circuit of holding magnet 14. By preference contact 40 is insulated from the stem 39ª of core 39 by insulation 43 freely movable on said stem and normally pressed toward contacts 41, 42, by spring 44 engaging stop 45 on said stem and bearing against insulation 43. A stop or collar 39ᵇ on a stem 39ª is adapted to operate contact 40 when core 39 moves a certain distance upwardly. Coil 34 is shown supported by screws and insulation upon base 2. Conductor 17 connects line conductor 6 with contact 41 and branch 14ᶜ connects contact 42 with magnet 14. Coil 34 and member 1 are included in the main line circuit. In the normal position of the parts the core 39 will engage magnetically reversible member 1 and contact 40 will engage contacts 41, 42, whereby the circuit of holding magnet 14 will be closed at said contacts. When switch 11 is manually closed the current flows through coil 34 and causes magnetic attraction on core 39 to effect an upward pull on the core, in accordance with the nature of a solenoid but the arrangement is such that the downward pull on the magnetized iron core at the point of contact between said core and member 1 is sufficient to resist such upward pull on the core so long as member 1 is magnetic. When member 1 loses its magnetic attractiveness, as by reason of being heated by the current corresponding to an overload in circuit 6, the core 39 will move quickly upwardly forcibly and open the circuit of the holding magnet 14 at contacts 40, 41, 42, whereby switch 11 will be released to open the main line circuit 6. The working forces available in the construction described are quite large and will be sufficient to actuate any ordinary electrical or mechanical trip device.

In Figs. 7 and 8 the electromagnet and its core or movable member, in the nature of a solenoid, substantially in the form of Figs. 5 and 6, are adapted to directly control the line circuit 6 without holding magnet 14. In this instance manually controlled switch lever 46 is pivotally supported at 47 upon base 2 and carries a spring 48 having contact 49 to engage contact 26 of the main line 6. Lever 46 has a projection 46ª adapted to engage a latch 50, pivotally supported at 51 and having a portion 50ª in position to be engaged by stem 39ª of core 39, the latch retaining the lever to keep contact closed at 26, 49. Coil 34 is in circuit with member 1 in the main line. When switch lever 46 is operated to close main line circuit 6 at 49, 26, core 39 will engage magnetically reversible member 1, and when the current in the circuit flows through coil 34 the attraction between the magnetized core 39 and member 1 will be sufficiently great to keep them in contact, but when member 1 loses its magnetic capacity by reason of overload in circuit 6 the core 39 will be released and will immediately rise by reason of the attraction produced by coil 34 and will engage latch 50, causing the latter to release switch lever 46, which will operate to break the circuit of the main line at 49, 26. The circuit 6 leads from coil 34 through post 52 and conductor 17 to spring 48 to which said conductor is shown attached by means of clip 32 and screw 53 that secures spring 48 to lever 46.

In accordance with the various forms of construction illustrated as an embodiment of my invention it will be understood that whenever the main circuit of the system becomes overloaded to such an extent as to endanger the line or apparatus on the line, such as motor 12, the magnetically reversible member 1 will be sufficiently heated to cause it to lose its magnetic attractiveness with respect to the magnet or its movable member, armature or core to cause operation of a switch or contract to break the main line circuit, whether such switch or contact be controlled by such magnet indirectly through a holding magnet or directly itself by the first named magnet. By means of my improvements the main line is protected against injury from overload, and an advantage of my invention is that when circuit 6 has been automatically opened and is to be closed it is merely necessary to operate my improvement as described, overcoming the requirements heretofore necessary to remove burned out fuses and to replace the same in the circuit with increased expense.

While I have illustrated my invention as embodied in different forms of construction, it will be understood that my invention is not limited to the details of construction and arrangements of parts set forth, since the same may be varied, within the scope of the appended claims, without departing from the spirit of my invention.

When I refer to the magnet that is co-operative with the magnetically reversible member 1 I mean to include a permanent magnet or an electromagnet, the movable member of which acts with member 1 as a constituent element of the magnet for the purpose of my invention.

Having now described my invention, what I claim is:

1. An electric-circuit protector comprising a magnetically reversible member traversed by the current of said circuit, electromagnetic means traversed by the current of said circuit and differentially co-operative with said magnetically reversible member, a contact controlled by said electro-magnetic means, and a contact co-operative with the first named contact to control a circuit.

2. An electric-circuit protector comprising a current traversed magnetically reversible member, electromagnetic means in series circuit with said reversible member and differentially cooperative therewith, a movable member operative by said means, and contacts controlled by said movable member to control an electric circuit.

3. A circuit-protective device comprising a current-traversed magnetically reversible member, an electromagnet provided with a coil in electric circuit with the reversible member, and a movable magnetizable member for the electro-magnet magnetically differentially associated with the member and movable relatively thereto under predetermined conditions in the circuit to be protected.

4. A protective device comprising a current traversed magnetically reversible stationary member, an actuating coil in electric circuit therewith, and a movable magnetizable member, under the influence of the coil, normally engaging the member while the reversible member is magnetic and disengaging the reversible member under the influence of the coil when the reversible member becomes non-magnetic.

5. A protective device comprising an electromagnet provided with an actuating coil and a movable magnetizable member, and means associated with the coil to constitute a magnetic circuit containing a current-traversed magnetically reversible member serving normally to restrain the movable member against movement by the actuating coil.

6. In a protective device for an electric circuit, the combination with an operating coil, a circuit controlling member and a movable member subject to the influence of the operating coil for controlling the circuit controlling member, of a magnetically reversible member in electric circuit with the coil for counteracting the influence of the coil under predetermined thermal conditions in said reversible member.

7. A controlling device for an electric circuit comprising an actuating member, an operating coil therefor and a current-traversed magnetically reversible member influenced by the operating coil to restrain the actuating member against movement by the operating coil under predetermined conditions in the circuit to be controlled.

8. In an electric-circuit protector, the combination with an electromagnet having a movable core member associated therewith, of a member, adapted to lose its magnetism at a predetermined temperature, and to co-operate with the core member for normally holding the core member in an inoperative position, and means whereby current from the electric circuit of said electromagnet so heats said holding member that it loses its magnetism and permits the core to be moved to an operative position.

9. In an electric-circuit protector, the combination with an electromagnet coil energized from a circuit, and a movable core member actuated thereby, of a magnetically reversible member heated in accordance with the current traversing said circuit and cooperating with the core member to normally maintain said core member in an inoperative position and to permit the coil to actuate the core member to an operative position when the reversible member is heated to a predetermined temperature.

10. A protecting device for an electric circuit comprising a magnetically reversible member, means for permitting it to be heated in accordance with the current traversing said circuit, a magnet coil, and a movable core member actuable by said coil and normally operatively engaging said member and permitted to be disengaged therefrom under predetermined conditions in the circuit to be protected.

11. A protective device for an electric circuit, comprising an electromagnet having a movable magnetizable member and an actuating winding, a magnetically reversible member for normally restraining the movement of the magnetizable member with such force as to permit the magnetizable member to operate a predetermined time after a predetermined time and load condition has existed in the circuit, and to permit its instantaneous operation when a relatively larger overload traverses the circuit.

12. In an electric-circuit protector, the combination with an electromagnet having a movable core member associated therewith, of a thin strip of material that loses its magnetic quality at a predetermined temperature and having its narrow edge normally in operative engagement with said core member for holding the same against the pull of said electromagnet, and means whereby current from the electric circuit so heats the strip that it loses its magnetic quality and permits the core to be disengaged therefrom.

13. A protecting device for an electric circuit comprising a relatively thin strip of magnetically reversible material, means for permitting it to be heated in accordance with the load traversing said circuit, a magnet coil, and a movable core member actuable by said coil and normally operatively engaging the narrow edge of said strip and disengaged therefrom a time interval after a predetermined load traverses the circuit and instantaneously when a relatively heavy overload traverses the circuit.

Signed at Montclair, in the county of Essex, and State of New Jersey, this day of June, A. D. 1921.

HAROLD E. WHITE.